United States Patent [19]
Meyer

[11] Patent Number: 5,938,244
[45] Date of Patent: Aug. 17, 1999

[54] APPARATUS FOR FORMING FLUID TIGHT SEAL BETWEEN COUPLING BODY AND INSERT

[75] Inventor: David W. Meyer, Jordan, Minn.

[73] Assignee: Colder Products Company, St. Paul, Minn.

[21] Appl. No.: 08/879,899

[22] Filed: Jun. 20, 1997

[51] Int. Cl.$^6$ ................................................. F16L 37/14
[52] U.S. Cl. ............................................. 285/305; 285/379
[58] Field of Search ................................... 285/379, 380, 285/305

[56] References Cited

U.S. PATENT DOCUMENTS

| | | |
|---|---|---|
| 3,398,977 | 8/1968 | Yoneda ............................. 285/379 X |
| 4,436,125 | 3/1984 | Blenkush . |
| 4,541,457 | 9/1985 | Blenkush . |
| 4,753,458 | 6/1988 | Cuse et al. ......................... 285/379 X |
| 5,033,777 | 7/1991 | Blenkush . |
| 5,052,725 | 10/1991 | Meyer et al. . |
| 5,104,158 | 4/1992 | Meyer et al. . |
| 5,239,944 | 8/1993 | Hostetler ............................. 285/379 X |
| 5,316,041 | 5/1994 | Ramacier, Jr. et al. . |
| 5,494,074 | 2/1996 | Ramacier, Jr. et al. . |
| 5,542,717 | 8/1996 | Rea et al. ............................ 285/379 X |

FOREIGN PATENT DOCUMENTS

| | | | |
|---|---|---|---|
| 6805559 | 10/1968 | Netherlands ........................... 285/379 |
| 2031094 | 4/1980 | United Kingdom ................... 285/379 |

*Primary Examiner*—Dave W. Arola
*Attorney, Agent, or Firm*—Merchant, Gould, Smith, Edell, Welter & Schmidt, P.A.

[57] ABSTRACT

A method and apparatus for forming a fluid tight seal between a coupling body and an insert wherein the coupling body has a seal element disposed circumferentially about an inner wall for fluid tight engagement with an outer wall of an insert upon insertion of the insert into the coupling body.

4 Claims, 2 Drawing Sheets

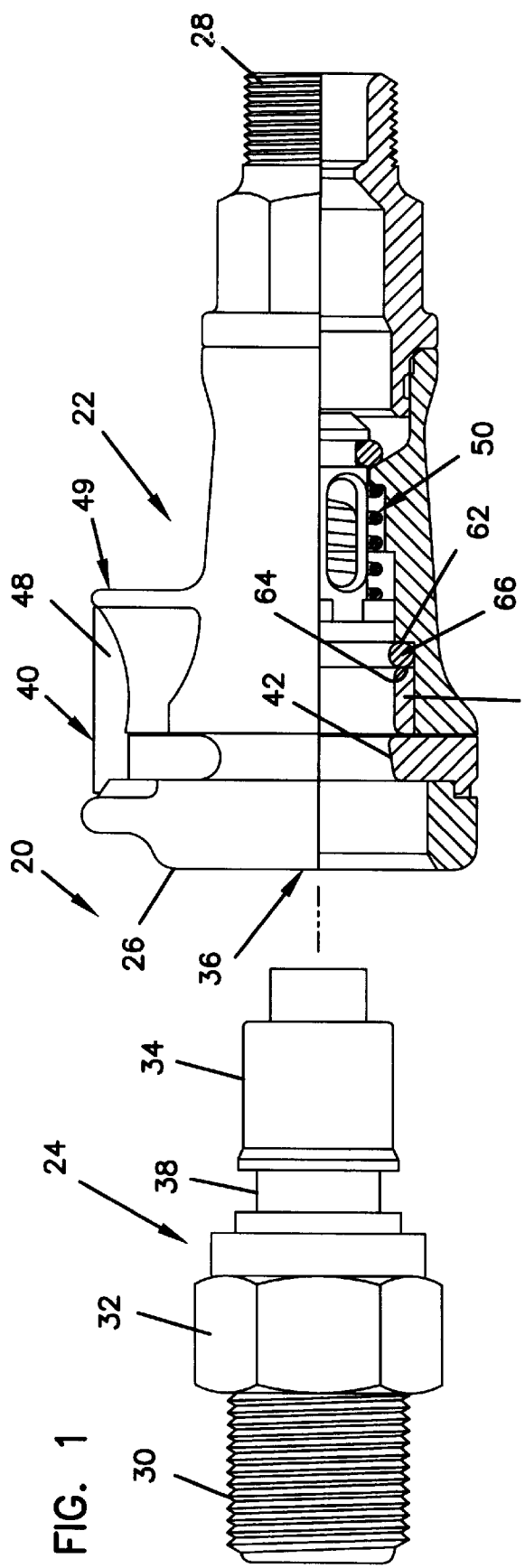
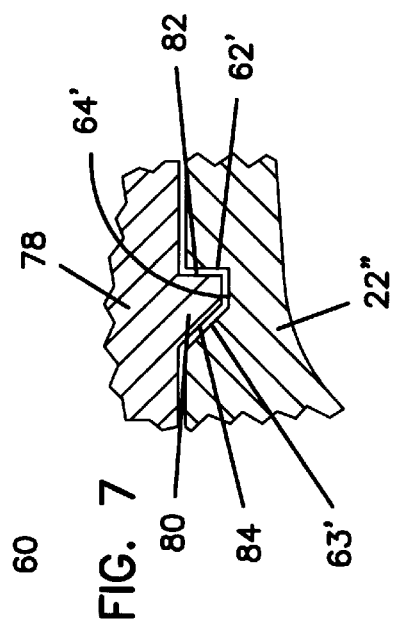
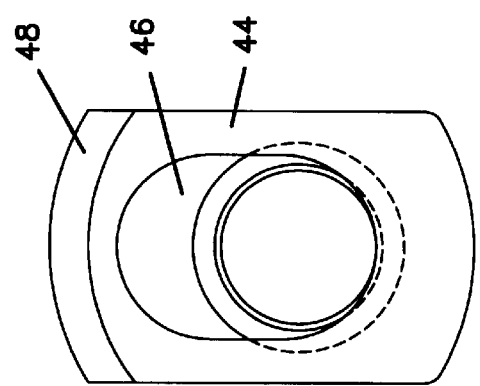

APPARATUS FOR FORMING FLUID TIGHT SEAL BETWEEN COUPLING BODY AND INSERT

BACKGROUND OF THE INVENTION

The present invention relates to a method and apparatus for forming a fluid tight seal between a coupling body and an insert.

In many coupling arrangements an insert, sometimes referred to as a stem, is simply inserted into a coupling body to form a fluid tight connection. Typically the fluid tight connection between the insert and the coupling body is provided by a circumferential seal element, such as an o-ring, disposed about the insert. Examples of such coupling assemblies are shown in applicant's commonly assigned U.S. Pat. Nos. 4,436,125; 4,541,457; and 5,033,777.

The inserts and the coupling bodies are often mass produced by plastic molding processes. Often times, the inserts are intended to be disposable after a single use. So efforts are made to try and reduce their overall manufacturing cost as much as possible. Many times the inserts and the coupling bodies are not made by the same manufacturers.

This presents challenges in being able to inexpensively, mass produce a plastic insert and coupling body combination which will not leak when connected.

The present invention provides a method and apparatus for forming a fluid tight seal between a coupling body and an insert which addresses many if not all of the above noted problems.

SUMMARY OF THE INVENTION

The present invention relates to a method and apparatus for forming a fluid tight seal between a coupling body and an insert wherein the seal element is disposed in the coupling body so as to engage an outer wall of the insert upon insertion of the insert into the coupling body.

In one embodiment, the invention relates to coupling assembly, comprising an insert; and a coupling body having a seal element circumferentially disposed about an inner wall of the coupling body, the seal element engaging an outer wall of the insert upon insertion of the insert into the coupling body to form a fluid tight seal between the insert and the coupling body.

In one embodiment of the invention, the seal element is held in place by a sleeve disposed between the seal element and a clip retention member engaging and retaining the insert in the coupling body.

In a further embodiment, the sleeve is retained within the coupling body by a flange provided on the outer periphery of the sleeve, with the flange being disposed within a groove provided on the inner wall of the coupling body. A pair of slots extending through the coupling body and into the groove facilitate formation of the groove and removal of the sleeve from the coupling body.

In yet another embodiment, the seal element is disposed in a groove molded into an inner wall of the coupling body.

In one embodiment the seal element is a conventional o-ring seal.

These and various other features and advantages of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings in which like reference numerals and letters generally indicate corresponding parts throughout the several views;

FIG. 1 is a cross sectional view of an insert and a coupling body in accordance with the principles of the present invention wherein the coupling body has a seal element for forming a fluid tight seal between the insert and the coupling body upon insertion of the insert into the coupling body;

FIG. 2 is an end view of the insert inserted into the coupling body; and

FIG. 7 is a partial sectional view of a mold core element forming groove in an interior wall of a coupling body for receipt of an o-ring.

DETAILED DESCRIPTION OF PREFERRED EMBODIMENT(S)

Figure 3:
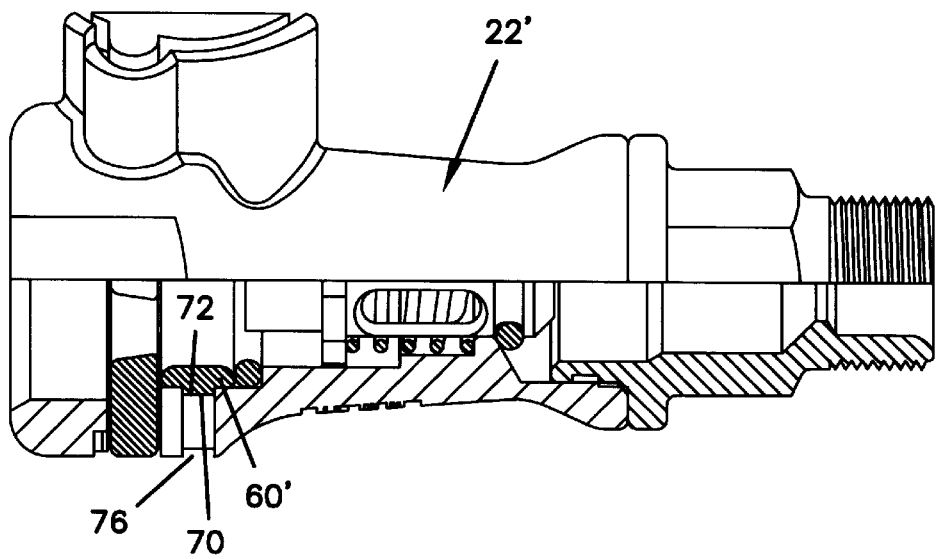
FIG. 3 is a view similar to FIG. 1, but showing an alternate embodiment.

Referring now to FIG. 1, there is a preferred embodiment of a coupling assembly 20 including a coupling body 22 and an insert 24 in accordance with the principles of the present invention. It will be appreciated, the coupling body 22 and the insert 24 may take on varying overall configurations depending on their particular application and operating environment. The coupling assembly 20 defines a fluid pathway therethrough when the coupling body 22 and the insert 24 are connected so as to allow the flow of fluid therethrough. It will be appreciated that additional valving might be present to allow the fluid flow to be turned on and off.

In the embodiment shown, the insert 24 includes a threaded end 30 for attachment to a fluid conveyance device, a hexagonal mid portion 32, and a tubular end 34 configured for insertion into a bore 36 of the coupling body.

The coupling body 22 includes a tubular end 26 for receiving the insert 24 and a threaded end 28 for attachment to a fluid conveyance device. Proximate the end 26, is a mechanical latch assembly 40 having an edge 42 which engages an external groove 38 in the insert 24 so as to mechanically couple the insert 24 and the coupling body 22 in a coupled state once the insert 24 is fully inserted into the coupling body 22. The mechanical latch assembly 40 has a plate 44 extending transversely of the coupling body bore 36 and having an opening 46 for insertion therethrough of the tubular end 34 of the insert 24. Typically attached to the plate is a thumb portion 48 which the operator uses to depress the mechanical latch downward upon insertion of the insert 24. The mechanical latch assembly 40 is suitably biased upward such that upon release it slides into engagement with the insert 24. While the biasing may be accomplished in many different ways by the use of springs or the like, in the embodiment shown, the biasing is accomplished by the resilient thumb portion 48 engaging an elongated member 49 extending up from the coupling body 22. In the embodiment shown, the coupling body 22 is shown as further including a shutoff poppet valve assembly 50 which normally closes the fluid flow path through the coupling body 22 upon removal of the insert 24.

Disposed immediately adjacent the plate 44 of the mechanical latch assembly is a sleeve 60. The sleeve 60 is spaced apart from a radially inwardly projecting circumferential shoulder portion 62 so as to define groove 64 wherein there is disposed a circumferential seal element such as an o-ring 66. The o-ring 66 engages an outer surface of the tubular end 34 of the insert 24, to provide a fluid tight seal upon insertion of the insert 24 into the coupling body 22.

The coupling body 22 might be assembled by inserting the poppet valve assembly 50. Next the o-ring 66 might be put in place and then the sleeve 60 press slid into position. The mechanical latch assembly 40 could then be installed.

Figure 4:
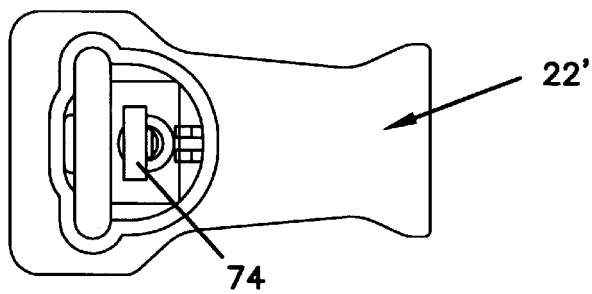
FIG. 4 is a top view of the coupling body shown in FIG. 3.
Figure 5:
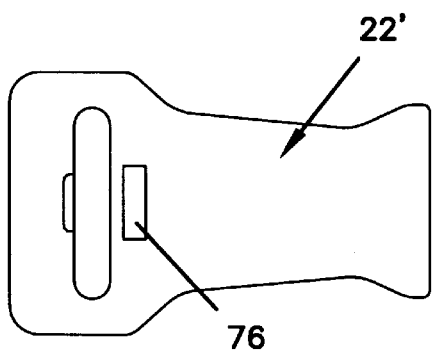
FIG. 5 is a bottom view of the coupling body shown in FIG. 3.
Figure 6:
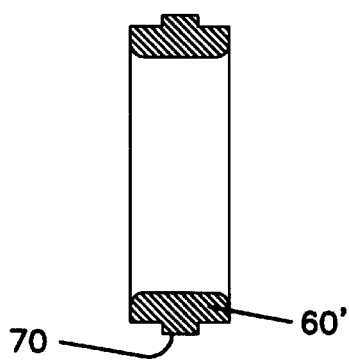
FIG. 6 is a cross sectional view of the sleeve used in the embodiment shown in FIG. 3.

In an alternative embodiment as shown in FIGS. 3–6, the sleeve 60' is secured within the coupling body 22' by providing a circumferential flange 70 on the outer periphery of the sleeve 60'. The flange 70 fits within a circumferential groove 72 provided in the inner wall of the coupling body 22' to axially retain the sleeve in place within the coupling body. A pair of diametrically opposite through-slots 74, 76 extend through the coupling body at the top and bottom thereof, as best seen in FIGS. 4 and 5, and into the groove 72. The slots 74, 76 facilitate formation of the groove and removal of the sleeve from the coupling body.

In an alternative embodiment as shown in FIG. 7, the groove 64 might be formed as a groove 64' in an inner wall of a coupling body 22" by use of a mold core element 78 which would have a projection 80 for forming the groove 64' in the wall of the coupling body 22". A first side wall 82 of the core projection 80 might extend transversely so as to form a substantially vertical or radially extending side wall 62' of the groove 64' and a second side wall 84 of the core projection 80 might extend obliquely so as to form an oblique side wall 63' of the groove 64'. The oblique second side wall 84 would allow the mold core element 78 to be removed from the bore 36 of the coupling body 22" and not destroy the groove 64' in the inner wall of the coupling body 22". The coupling body 22" might be made of a suitable resilient material such as acetyl which would give somewhat as the mold core element 78 was removed from the bore of the coupling body 22".

It will be appreciated that the present invention will allow greater quality control when making mass produced plastic coupling bodies and inserts. Coupling bodies because of their mass tend to have more irregularities from the molding process than do inserts. It is easier to make the inserts to more exact specifications than the coupling bodies. Accordingly, by integrating the seal element with the coupling body it will be easier to mass produce the coupling bodies since the coupling bodies can be made with higher tolerances. It is only necessary to maintain close, quality control at the seal element. The remainder of the coupling body does not require such rigid quality control and will still form a fluid tight seal with the seal element of the coupling body. Accordingly, it will be easier for third party manufacturers to make inserts which will reliably seal with another manufacturer's coupling bodies.

Having read the foregoing description, it is to be understood, that even though numerous characteristics and advantages of various embodiments in accordance with the principles of the invention have been set forth in the foregoing description, together with details of the structure and function of the invention, the disclosure is illustrative only, and changes may be made in detail, especially matters of shape, size and arrangement of the parts within the principles of the invention to the full extent indicated by the broad general meaning of the term in which the appended claims are expressed.

What is claimed is:

1. A coupling assembly, comprising:

an insert; and a coupling body having a seal element circumferentially disposed about an inner wall of the coupling body, the seal element engaging an outer wall of the insert upon insertion of the insert into the coupling body to form a fluid tight seal between the insert and the coupling body;

wherein the seal element is held in place by a sleeve that is sandwiched between the seal element and a mechanical latch mechanism engaging and retaining the insert in the coupling body whereby the sleeve is disposed immediately adjacent to the mechanical latch mechanism;

the sleeve further including a circumferentially extending flange about a periphery thereof, said flange being disposed within a circumferentially extending groove in the inner wall of the coupling body, and the coupling assembly further including a pair of slots extending through the coupling body and into the circumferential groove.

2. A coupling assembly in accordance with claim 1, wherein said slots extend into the circumferential groove on diametrically opposite sides of the groove.

3. A coupling assembly, comprising:

an insert having a groove formed in an external surface thereof; and a coupling body having a seal element circumferentially disposed about an inner wall of the coupling body, the seal element engaging an outer wall of the insert upon insertion of the insert into the coupling body to form a fluid tight seal between the insert and the coupling body;

wherein the seal element is held in place by a sleeve that is disposed between the seal element and a mechanical latch mechanism engaging and retaining the insert in the coupling body, said mechanical latch mechanism including a portion that is disposable within said groove when the insert is inserted into the coupling body;

the sleeve further including a circumferentially extending flange about a periphery thereof, said flange being disposed within a circumferentially extending groove in the inner wall of the coupling body; and the coupling assembly further including a pair of slots extending through the coupling body and into the circumferential groove.

4. A coupling assembly in accordance with claim 3, wherein said slots extend into the circumferential groove on diametrically opposite sides of the groove.

* * * * *